United States Patent
Rivers et al.

(10) Patent No.: US 6,963,029 B1
(45) Date of Patent: Nov. 8, 2005

(54) METHOD AND APPARATUS FOR HOUSING SPLICED WIRES ON SIDING

(75) Inventors: Paul Rivers, Cullman, AL (US); Frederick Diggle, III, Mountain Brook, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/945,171

(22) Filed: Sep. 20, 2004

(51) Int. Cl.[7] ................................................. H01H 9/02

(52) U.S. Cl. ........................ 174/58; 174/60; 174/135; 174/41; 174/92

(58) Field of Search .......................... 174/58, 60, 135, 174/41, 59, 92; 248/906; 439/535; 220/3.8, 220/3.92, 4.02

(56) References Cited

U.S. PATENT DOCUMENTS

| | | | | |
|---|---|---|---|---|
| 3,836,696 A | * | 9/1974 | Gressitt et al. | 174/41 |
| 4,992,627 A | * | 2/1991 | Mullaney | 174/41 |
| 5,886,300 A | * | 3/1999 | Strickler | 174/135 |
| 6,107,567 A | * | 8/2000 | Blalock | 174/58 |

* cited by examiner

*Primary Examiner*—Dhiru R. Patel
(74) *Attorney, Agent, or Firm*—Cantor Colburn LLP

(57) ABSTRACT

A housing for a spliced wire includes a base, a wall extending from an edge defining a perimeter of the base, and a cavity defined by the wall and base. The wall includes opposing sides each having an opening receptive to a wire therethrough. A cover is pivotally hinged to one edge defining the wall and is configured to close the cavity to an environment and protect a splice between each wire from the environment. A siding clip extends from either the base or wall and is configured to clip to siding of a building structure.

19 Claims, 3 Drawing Sheets

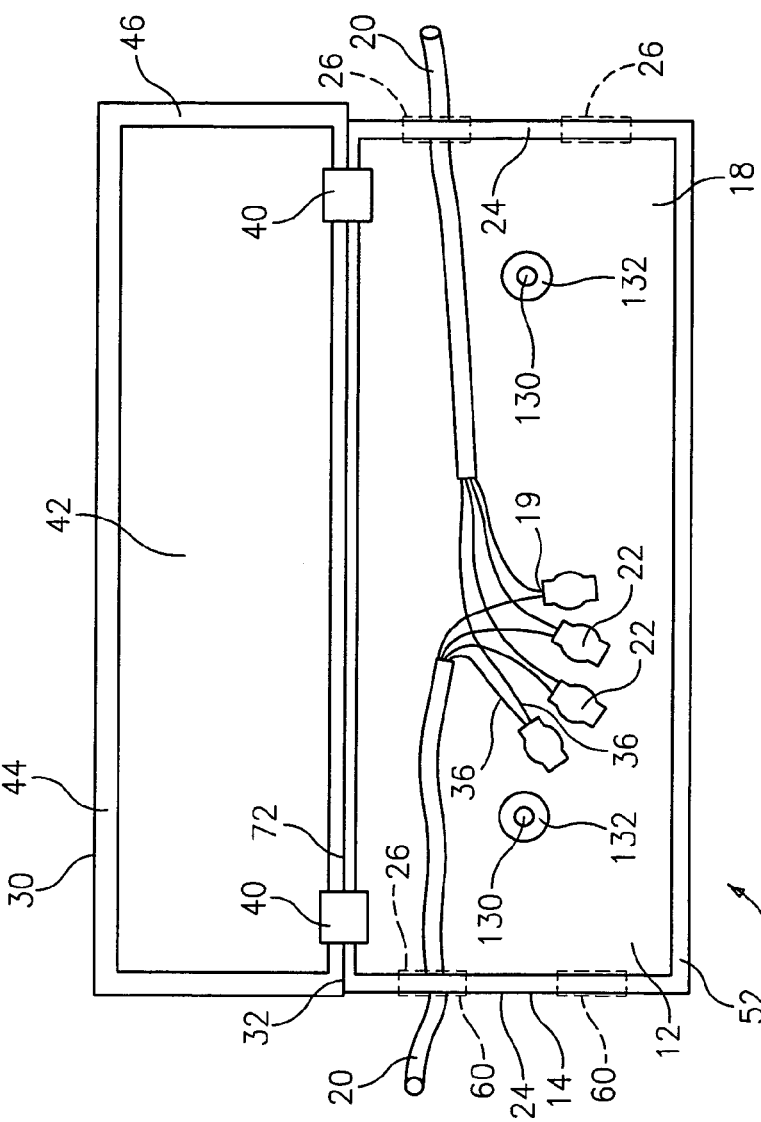
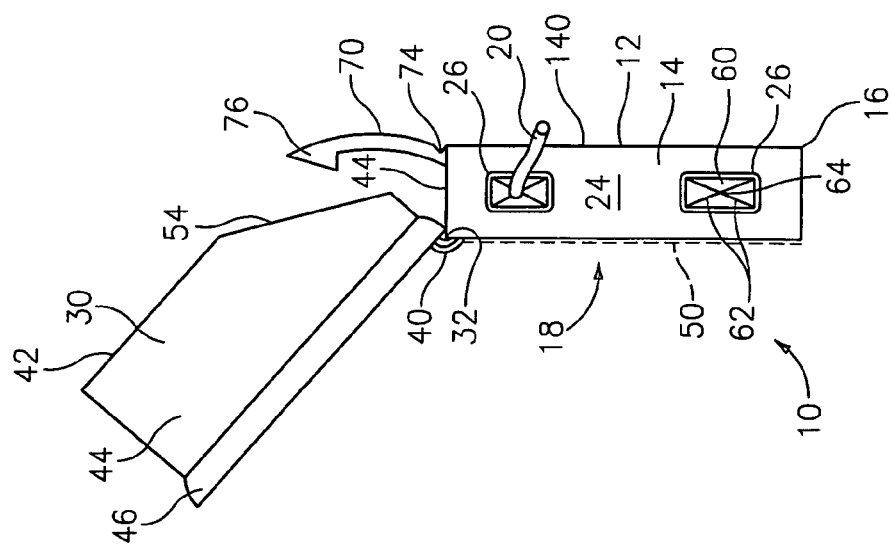

METHOD AND APPARATUS FOR HOUSING SPLICED WIRES ON SIDING

BACKGROUND OF THE INVENTION

The present disclosure relates generally to a method and apparatus for housing spliced wires on siding on a building structure, more particularly, to a splice box that is easily attached to the siding on a building and that houses one or more spliced wires within the housing.

In the telecommunications or electronics industry, it is common practice for a technician to route wires along an outside wall of a building, such as a home or business. Conventional practice provides several approaches that involve using a cable clip, using a clamp with a screw, and stapling the wire to the siding.

For example, technicians regularly install phone jacks and wires to homes and businesses, where the wires are often run along the outside wall of the building. The problem is that long runs of wire cannot be spliced together along an exposed section of wall, as the wire is left exposed to outside environmental conditions, such as, for example, sun, wind, precipitation, wildlife, and others. Simply taping up the wires at the splice is not acceptable practice.

Another problem occurs when sophisticated burglars cut telephone wires on the outside of buildings to disable an automatic calling feature of alarms prior to their entry. When the technician arrives the next day to repair the damage to the wires, the technician cannot simply mend the cut. The technician has to run new runs of outside wire creating unnecessary expense.

Currently, technicians are supplied with a wire terminal box that is commonly used to enclose a jack wire splice. It is rather large and is best used on telephone poles. The currently supplied wire terminal box is primarily intended for use with heavy duty wire, since it contains a large ground lug that is unnecessary for use in splicing jack wires on the exterior of a home or business. Furthermore, the lugs inside the box limit the amount of space available for the wires.

Using the currently supplied box is problematic because it has only one entrance hole and one corresponding exit hole for wires. If more than one wire is routed in the box, the wires may become pinched, which may cause electrical shorts.

In addition, the currently supplied box is not intended for placing on the exterior of a home or business. Since most applications that require wires to be spliced typically occur on the exterior of the structure, a device that can house the spliced wires while having aesthetic appeal when coupled to exterior siding is desired, especially when coupled to vinyl siding.

Accordingly, what is needed is a device to overcome the above and/or other shortcomings of the conventional approaches.

SUMMARY

The present disclosure provides a method and apparatus for housing spliced wires on siding on a home or business.

According to one aspect, a housing for a spliced wire includes a base, a wall extending from an edge defining a perimeter of the base, and a cavity defined by the wall and base. The wall includes opposing sides each having an opening receptive to a wire therethrough. A cover is pivotally hinged to one edge defining the wall and is configured to close the cavity to an environment and protect a splice between each wire from the environment. A siding clip extends from either the base or wall and is configured to clip to siding of a building structure.

Another aspect is a housing for a spliced wire that includes a base, a wall extending from an edge defining a perimeter of the base, and a cavity defined by the wall and base. The wall includes opposing sides each having an opening receptive to a wire therethrough. A cover is pivotally hinged to one edge defining the wall and is configured to close the cavity to an environment and protect a splice between each wire from the environment. The housing further includes a means for fastening the housing to a building structure.

Another aspect is a method for housing for a spliced wire. The method includes configuring a base having a wall extending from an edge defining a perimeter of the base, the wall and the base defining a cavity; configuring an opening receptive to a wire therethrough in each of opposing sides defining the wall; configuring a cover to close the cavity to an environment and protect a splice between each said wire from the environment, the cover being pivotally hinged to one edge defining the wall; and employing a break-away siding clip extending from either the base or the wall, the siding clip being configured to clip to siding of a building structure.

BRIEF DESCRIPTION OF THE DRAWINGS

Referring to the exemplary drawings wherein like elements are numbered alike in the several FIGURES:

FIG. 1 is a side view of a housing in an open position for a spliced wire on a building structure exterior according to exemplary embodiments of this invention;

FIG. 2 is a front view of the housing of FIG. 1;

DETAILED DESCRIPTION OF EXEMPLARY EMBODIMENTS OF THE INVENTION

Figure 3:
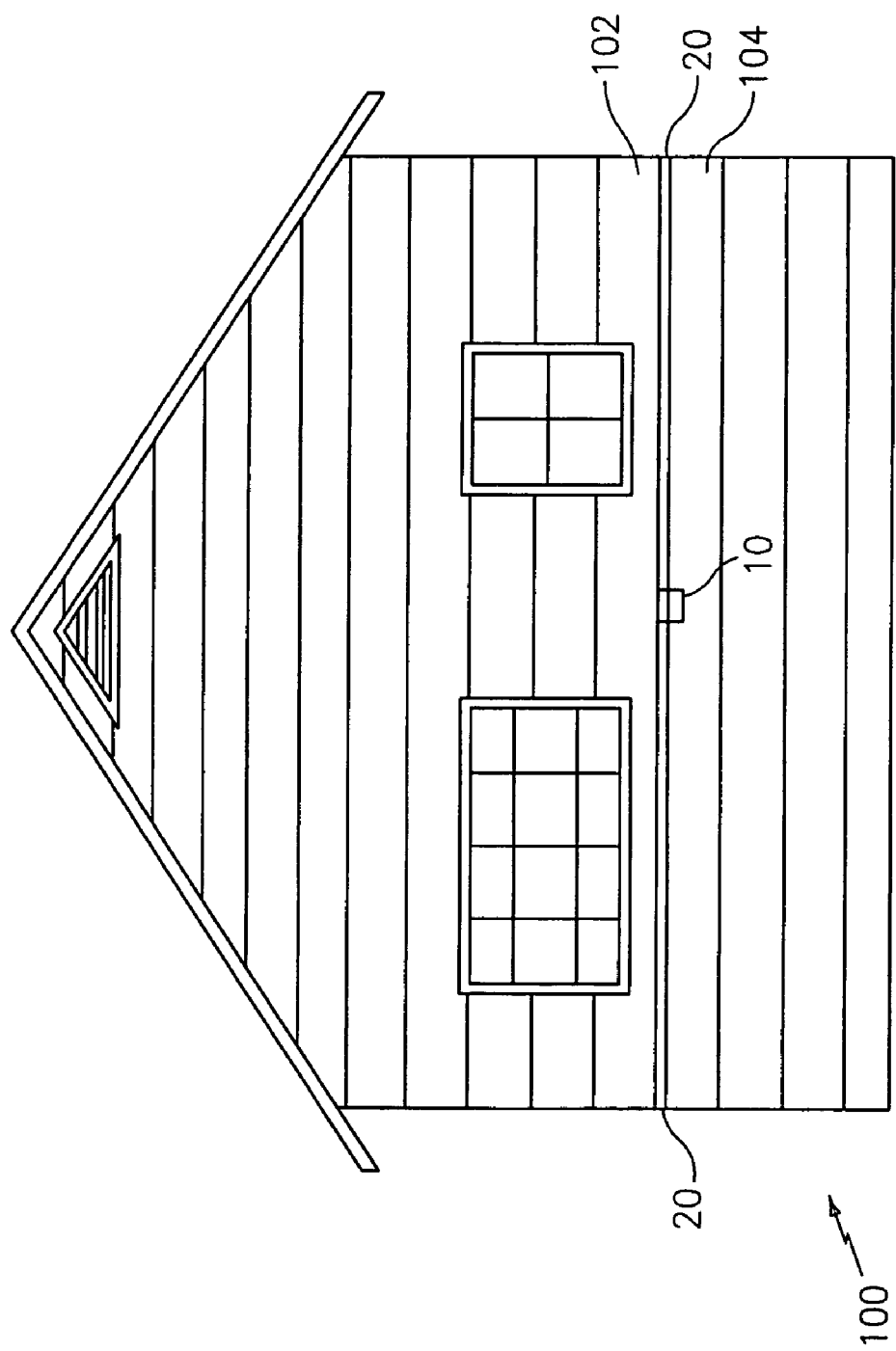
FIG. 3 is a front view of the housing of FIGS. 1 and 2 in a closed position extending along a side of a building according to exemplary embodiments of this invention.

Exemplary embodiments of this invention will now be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the schematics and the like represent conceptual views of illustrative structures embodying this invention.

In the claims hereof any element expressed as a means for performing a specified function is intended to encompass any way of performing that function including, for example, a combination of elements that performs that function. The invention as defined by such claims resides in the fact that the functionalities provided by the various recited means are combined and brought together in the manner that the claims call for. Applicant thus regards any means that can provide those functionalities as equivalent as those shown herein.

According to exemplary embodiments, this invention is directed to a housing for a spliced wire that attaches to siding panels of a home or a business and that supports one or more wires within an interior cavity defined by the housing. According to exemplary embodiments of this invention, the housing for the spliced wire provides an aesthetically attractive enclosure for routing, supporting, and securing one or more wires along a side wall(s) of a home or business that is covered in siding panels, such as aluminum siding, vinyl siding, and other siding type panels. The housing for the spliced wire may be designed with an exterior surface to match the mated siding panel. For example, if the siding of the home is white-colored vinyl, then the housing is composed of a complimentary material to match and/or to compliment (e.g., a trim color, a shutter color, and/or a complimentary composite material) the white-colored vinyl. According to further exemplary embodiments, the housing for the spliced wire is easy to install and is optionally secured between an upper siding panel and a lower siding panel. Alternatively, the housing for the spliced wire may be fastened using mechanical fasteners including, but not limited to, screws, double-sided tape, hook and loop fasteners, and the like, for example. The housing for the spliced wire may have a variety of lengths, widths, heights, and other dimensions. Still further, this invention includes methods for disposing a housing for a spliced wire to engage an upper and a lower siding panel using clips and/or using mechanical fasteners for supporting the housing directly to a siding panel.

FIGS. 1 and 2 illustrate an exemplary housing for a spliced wire in side and front views, respectively. Housing 10 includes a base 12 and a wall 14 surrounding a perimeter defining base 12. Wall 14 extends from an edge 16 defining the perimeter of base 12. Base 12 and wall 14 define a cavity 18 providing suitable space for a splice 19 between wires 20 using crimp connectors 22. Crimp connectors 22 are envisioned as the most commonly used, but other wire connectors, including wire nuts, for example, are contemplated. Opposing sides 24 defining two sides of wall 14 each include at least one opening 26 receptive to wire 20 therethrough.

A cover 30 is pivotally hinged to one edge 32 defining wall 14 with a hinge 40. Cover 30 is configured to close cavity 18 to an environment outside housing 10 and protect a splice 19 corresponding to respective conductors 36 of wires 20 from the environment. In an exemplary embodiment, hinge 40 includes a pair of living hinges each disposed at opposing ends defining one edge 32. More particularly, living hinges 40 may be integrally formed with cover 30 and wall 14. Each hinge 40 is disposed internal to cavity 18 when cover 30 is closed. In an exemplary embodiment, hinge 40 is integral with wall 14 and cover 30, as they are preferably molded. Alternatively, hinge 40 may be formed to extend along a length defining one edge 32 to create a sealed barrier to environmental elements from entering cavity 18 at least through one edge 32.

Cover 30 includes a lid 42 and a lid wall 44 normal to lid wall 42 and surrounding a periphery thereof. Lid wall 44 includes a flared edge 46 defining a terminal end thereof receptive to surrounding a terminal end of wall 14 to seal against elements of the environment from entering cavity 18 when cover 30 is closed. A gasket 50 (shown with phantom lines in FIG. 1) may be employed on a terminal edge 52 defining wall 14 to further aid sealing between wall 14 and cover 30. In an exemplary embodiment, lid 42 may include an angulated surface 54 tapering toward one edge 32 for aesthetic appeal with respect to a contour of siding in which it is employed. For example, angulated surface 54 may include a contour substantially similar to a contour of the siding.

With reference to FIGS. 1 and 2, each opening 26 includes a grommet 60 closing opening 26 to the environment with or without wire 20 extending therethrough. More specifically, grommet 60 is pliable and includes a pair of thinned regions 62 intersecting at a point 64. Thinned regions 62 facilitate spreading grommet 60 open when an axis of wire 20 is aligned with intersection point 64 and manually biased into cavity 18. In this manner, the pliable grommet seals an interface between wire 20 and a corresponding opening 26 against entry of environmental elements into cavity 18 through opening 26. In an exemplary embodiment, there is a pair of openings 26 and respective grommets 60 on each opposing side 24. In exemplary embodiments, grommet 60 is a rubber grommet. It will be further noted that although grommet 60 has been described with a pair of intersecting thinned regions 62 to facilitate entry and sealing of wire 20, other suitably configured grommets are contemplated for use.

Housing 10 further includes a siding clip 70 extending from a top portion 72 of wall 14 receptive to clipping housing 10 to siding of a building structure. Siding clip 70 is defined with one end having a break away feature 74 receptive to manually breaking off the siding clip when mounting base directly to the siding using a mechanical fastener (not shown). Siding clip 70 is defined at an opposite end with a clip feature 76 configured to clip into a joint interface between contiguous side panels 102 and 104 covering an exterior of a building structure. (See FIGS. 3–5).

Figure 5:
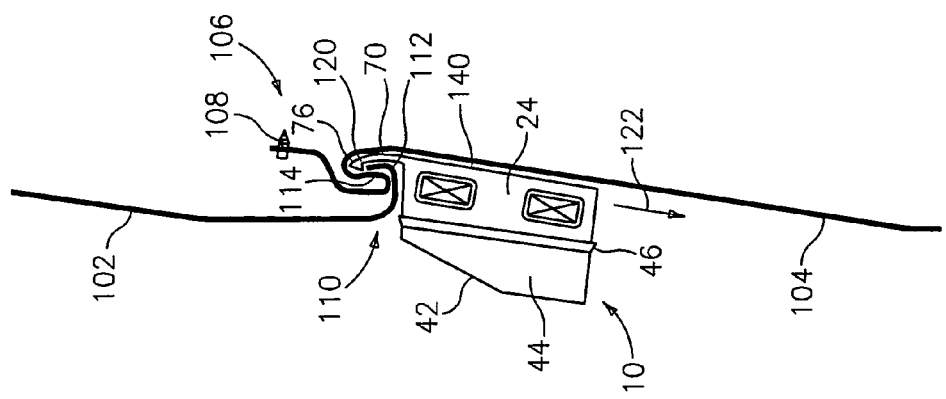
FIG. 5 is a side view of the housing of FIG. 4.
Figure 4:
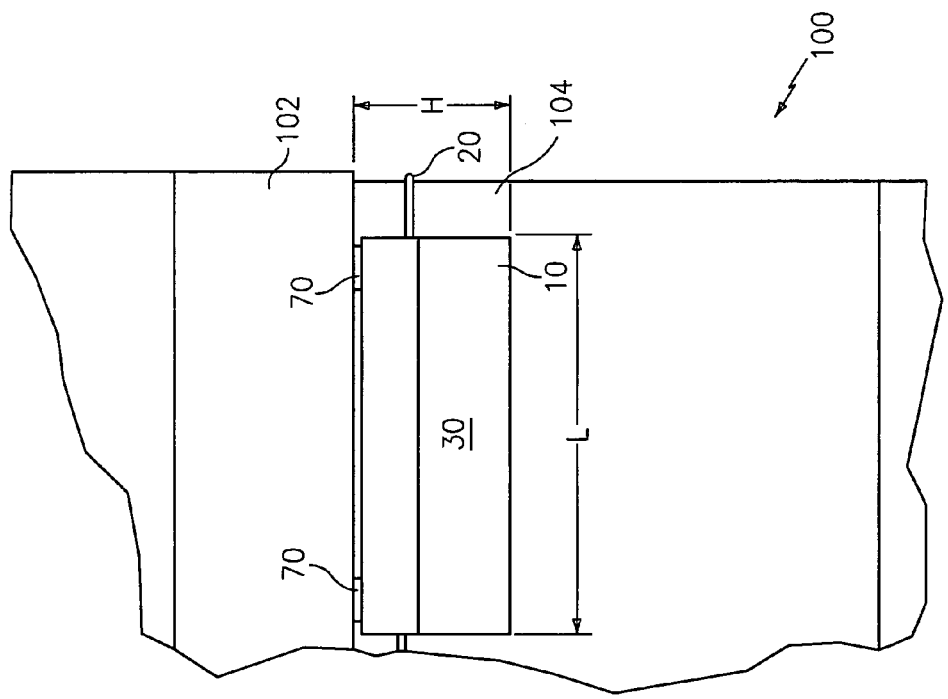
FIG. 4 is a front view of the housing of FIG. 3 positioned between an upper siding panel and a lower siding panel according to exemplary embodiments of this invention.

The housing 10 for spliced wire 20 may be used as generally shown in FIGS. 3–5. When routing one or more wires 20, a technician affixes the housing 10 along a side of a building 100 between an upper siding panel 102 and a lower siding panel 104. As depicted in FIG. 5, panels 102 and 104 may include vinyl siding where a top portion 106 of lower siding panel 104 fastened to the building structure using a mechanical fastener 108, such as a screw for example. A lower portion 110 of upper siding panel includes a lip 112 that is received in a J-channel 114 configured in top portion 106 of lower siding panel 104. Clip feature 76 is configured to be received in J-channel 114 behind lip 112. Clip feature 76 is further defined with a shoulder 120 disposed on a terminal end defining lip 112 to support housing 10 against building 100 and prevent housing 10 from translation in a direction indicated by arrow 122.

Once housing 10 is operably coupled to building 100, the technician thereafter pushes the wire(s) 20 into respective openings 26 to interior cavity 18 to splice respective conductors 36 together. Thus, after cover 30 is closed, the spliced wire is routed, supported, and/or protected from environmental conditions and wildlife in an aesthetically pleasing housing 10. Examples of routing wires include, but are not limited to installation, maintenance, testing, and/or other types of repair work on hardware and equipment used by the telecommunications and/or electrical industry. Still further, this invention includes methods of positioning the housing for spliced wire and/or a method of routing, supporting, and/or protecting one or more wires that extend within the housing 10 along the side of the building 100.

Referring again to FIGS. 1 and 2, using clip feature 76 with panels 102 and 104 is one exemplary method of fixing housing 10 to building 100. In an alternative embodiment, base 12 includes a pair of mounting apertures 130 receptive to a mechanical fastener, such a screw 108 for mounting housing 10 to lower side panel 104. In this manner, siding clips 70 are first removed by manually breaking off each clip at break away region 74. In an exemplary embodiment, break away region 74 is a thinned region defining each clip 70 at an end proximate an interface or joint with wall 14. Each clip is manually pivoted at the break away region to break off a respective clip 70.

In an exemplary embodiment, each mounting aperture 130 optionally includes a corresponding screw pad or reinforced pedestal 132 surrounding each aperture 130 providing a reinforced area to attach corresponding mechanical fasteners. Alternatively, double-sided tape or hook and loop fastening means, for example, but not limited thereto, may be operably coupled to a backside 140 of base 12 for attachment to lower side panel 104 without or in supplement to mechanical fasteners through apertures 130 or with clips 70.

According to exemplary embodiments of this invention with reference to FIG. 4, the housing 10 for the spliced wire has a length (L) of approximately five (5) inches, a height (H) of approximately two (2) inches. Alternatively, as one of ordinary skill in the art appreciates, these measurements may vary so long as the housing 10 fits between the first panel 102 and the second panel 104 to support one or more spliced wires 20 as herein described. Still according to further embodiments, housing 10 may be made of any type of material, such as a plastic, polymer, arid/or metal. If a metal component is used for the wire channel device, then that component may also have a durable finish coating, such as polyurethane powder. Alternatively, the housing 10 could be constructed of other suitable materials that can withstand a wide range of temperatures, humidity, moisture, and other environmental and wildlife conditions. For example, the housing 10 may include composite, ceramic, glass, crystal, and/or other materials and combination capable of being used as herein described.

According to the exemplary embodiments of the invention, housing 10 is configured as a splice box creating a junction where a technician can splice two or more wires together on the exterior of a building structure in a weatherproof housing. The technician can either fasten the base to directly to the building structure using screws for example, attach with double-sided tape or hook and loop fastening means, or attach to vinyl/aluminum siding with the molded clips. The molded clips are configured to be manually snapped off for attachment to non-vinyl sides building structures, such as wooden walls, for example. The weatherproof housing 10 includes four entrance/exit grommets that are large enough to connect four (4) corresponding wires inside a cavity defined by the weatherproof housing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A housing for a spliced wire comprising:
   a base;
   a wall extending from an edge defining a perimeter of said base, said wall and said base defining a cavity, said wall including opposing sides each having an opening receptive to a wire therethrough;
   a cover pivotally hinged to one edge defining said wall, said cover configured to close said cavity to an environment and protect a splice between each said wire from the environment; and
   a siding clip extending from one of said base and said wall, said siding clip configured to clip to siding of a building structure, wherein said siding clip is configured to clip into an interface joint between contiguous a first siding panel and a second siding panel, said siding clip being shaped to be received within a J-channel of said first siding panel and beneath a lip of said second siding panel, the lip received in the J-channel.

2. The apparatus of claim 1, wherein said cover is pivotally hinged to said wall with a hinge along at least a portion defining said one edge.

3. The apparatus of claim 2, wherein said hinge is a living hinge.

4. The apparatus of claim 2, wherein said hinge is disposed within said cavity when said cover is closed.

5. The apparatus of claim 1, wherein said openings each include a grommet closing each opening to the environment.

6. The apparatus of claim 5, wherein said each opening includes two opens on each of said opposing sides.

7. The apparatus of claim 5, wherein each said grommet includes a rubber grommet having a cross hatch thinned region receptive to said wire through an intersection defining said cross hatch thinned region.

8. The apparatus of claim 1, wherein a facing edge defining at least one of a terminal edge along a perimeter of said cover and said wall is receptive to a gasket for sealing said cavity.

9. The apparatus of claim 1, wherein said base is rectangular.

10. The apparatus of claim 9, wherein said cover is defined by a lid and a lid wall normal to said wall surrounding a periphery thereof.

11. The apparatus of claim 1, wherein said siding is exterior vinyl siding.

12. A housing for a spliced wire comprising:
   a base;
   a wall extending from an edge defining a perimeter of said base, said wall and said base defining a cavity, said wall including opposing sides each having an opening receptive to a wire therethrough;
   a cover pivotally hinged to one edge defining said wall, said cover configured to close said cavity to an environment and protect a splice between each said wire from the environment; and
   a siding clip extending from one of said base and said wall, said siding clip configured to clip to siding of a building structure
   wherein said siding clip extends from said one of said base and said wall with a break away feature receptive to manually breaking off said siding clip when mounting said base to said siding.

13. The apparatus of claim 12, wherein said base includes at least one mounting opening receptive to a mechanical fastener for mounting to said siding.

14. The apparatus of claim 13, wherein said mounting opening includes a reinforcing pedestal surrounding said mounting opening.

15. A housing for a spliced wire comprising:
a base;
a wall extending from an edge defining a perimeter of said base, said wall and said base defining a cavity, said wall including opposing sides each having an opening receptive to a wire therethrough;
a cover pivotally hinged to one edge defining said wall, said cover configured to close said cavity to an environment and protect a splice between each said wire from the environment; and
a siding clip extending from one of said base and said wall, said siding clip configured to clip to siding of a building structure,
wherein said lid is angulated toward said one edge substantially following a contour of said siding.

16. A housing for a spliced wire comprising:
a base;
a wall extending from an edge defining a perimeter of said base said wall and said base defining a cavity, said wall including opposing sides each having an opening receptive to a wire therethrough;
a cover pivotally hinged to one edge defining said wall, said cover configured to close said cavity to an environment and protect a splice between each said wire from the environment; and
a siding clip extending from one of said base and said wall, said siding clip configured to clip to siding of a building structure,
wherein said siding clip extending from one of said base and said wall includes a pair of break-away clips receptive to being clipped to vinyl siding.

17. The apparatus of claim 16, further comprising a fastener including at least one of a screw through the base, double side tape, and hook and loop fasting means.

18. A method for housing for a spliced wire, the method comprising:
configuring a base having a wall extending from an edge defining a perimeter of said base, said wall and said base defining a cavity;
configuring an opening receptive to a wire therethrough in each of opposing sides defining said wall;
configuring a cover to close said cavity to an environment and protect a splice between each said wire from the environment, said cover being pivotally hinged to one edge defining said wall; and
employing a break-away siding clip extending from one of said base and said wall, said siding clip configured to clip to siding of a building structure.

19. The method of claim 18, further comprising:
manually breaking off said clip when mounting said base directly to said siding with a mechanical fastener.

* * * * *